US006631181B1

United States Patent
Bates et al.

(10) Patent No.: US 6,631,181 B1
(45) Date of Patent: Oct. 7, 2003

(54) METHOD AND SYSTEM FOR ALLOWING SPECIFICATION OF MESSAGING SYSTEM GREETINGS ACCORDING TO A CALLER IDENTIFICATION

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 09/637,850

(22) Filed: Aug. 10, 2000

(51) Int. Cl.⁷ .......................... H04M 11/00; H04M 1/64
(52) U.S. Cl. ................. 379/88.18; 379/88.21; 379/142.06
(58) Field of Search .................. 379/88.19–88.21, 379/142.01, 142.04, 142.06

(56) References Cited

U.S. PATENT DOCUMENTS

| | | | | |
|---|---|---|---|---|
| 5,276,731 A | * | 1/1994 | Arbel et al. | 379/100.13 |
| 5,400,393 A | * | 3/1995 | Knuth et al. | 379/73 |
| 5,481,597 A | | 1/1996 | Given | |
| 5,748,709 A | | 5/1998 | Sheerin | |
| 5,768,349 A | * | 6/1998 | Knuth et al. | 379/88.22 |
| 5,832,062 A | * | 11/1998 | Drake | 379/88.16 |
| 5,883,942 A | * | 3/1999 | Lim et al. | 379/142.01 |
| 5,892,814 A | * | 4/1999 | Brisebois et al. | 379/88.24 |
| 5,949,852 A | * | 9/1999 | Duncan | 379/67.1 |
| 6,067,355 A | * | 5/2000 | Lim et al. | 379/142.02 |
| 6,240,170 B1 | * | 5/2001 | Shaffer et al. | 379/142.15 |
| 6,266,399 B1 | * | 7/2001 | Weller et al. | 379/142.06 |
| 6,335,962 B1 | * | 1/2002 | Ali et al. | 379/88.11 |
| 6,442,243 B1 | * | 8/2002 | Valco et al. | 379/67.1 |
| 6,459,776 B1 | * | 10/2002 | Aktas et al. | 379/88.13 |

OTHER PUBLICATIONS

Research Disclosure, Apr. 2000, Article 432150, p. 762 entitled "Advanced Answering Machine Features Based on Caller ID Information".

U.S. patent application Ser. No. 09/637,659, Bates et al., filed Aug. 11, 2000.

\* cited by examiner

Primary Examiner—Fan Tsang
Assistant Examiner—Joseph Phan
(74) Attorney, Agent, or Firm—Bracewell & Patterson LLP; Roy W. Truelson

(57) ABSTRACT

In accordance with the present invention, a unique caller is identified from an incoming call transmission at a messaging system. A particular greeting announcement is played to the unique caller from among multiple greeting announcements recorded at the messaging system, wherein the particular greeting announcement was previously specified by a subscriber of the messaging system for the unique caller. In a preferred embodiment, the subscriber of the messaging system is preferably enabled to specify multiple greeting announcements by caller for playing prior to switching to a single subscriber mailbox at the messaging system.

24 Claims, 3 Drawing Sheets

METHOD AND SYSTEM FOR ALLOWING SPECIFICATION OF MESSAGING SYSTEM GREETINGS ACCORDING TO A CALLER IDENTIFICATION

CROSS-REFERENCE TO RELATED APPLICATION

The present application is related to the following co-pending application, which is filed on even date herewith and incorporated herein by reference:

U.S. patent application Ser. No. 09/637,659.

BACKGROUND OF THE INVENTION

1. Technical Field

The present invention relates in general to an improved messaging system and, in particular, to a method and system for specifying messaging system greetings according to caller identification. Still more particularly, the present invention relates to a method and system for allowing a messaging system subscriber to pre-record multiple greeting announcements for a single mailbox and specify recipients of each of the multiple greeting announcements according to caller identification.

2. Description of the Related Art

In this age of communication, telephone answering machines and network messaging services have become an essential part of business and household operation. There is a reliance upon a machine or service to answer phone calls and record messages from callers when a human recipient is not available.

In general, a telephone answering machine or network messaging service acts to answer calls designated for a particular phone number, play a pre-recorded greeting message, and allow a user to leave a message that can then be later retrieved and listened to by a recipient.

In particular, telephone answering machines are typically either stand-alone units or coupled with a telephone device. The telephone answering machine is typically equipped with a speaker to play-back recorded messages. A user may physically press a button on the telephone answering machine to start play-back via the machine speaker, for example, or may call the telephone answering machine and enter a special code via a telephone to start play-back to that telephone, for example. A single telephone answering machine may include multiple "mailboxes" where each mailbox is typically introduced by a distinct greeting message and a caller is enabled to select between the multiple mailboxes.

Network messaging services are typically provided by telephone and other telecommunication companies and may be subscribed to by users, typically for a fee. The messaging service switches a phone call to a network messaging service after a particular number of rings and records messages left by callers in a particular mailbox that can be accessed by a recipient. Typically, the recipient calls the messaging service and enters a special code to access the mailbox of recorded messages. A single phone number may have multiple mailboxes associated therewith that can be selected from by a caller once the network messaging service answers the phone call.

Another form of messaging often comes from capturing a caller identification (caller ID) for the phone number of a caller. A caller ID may be captured and displayed to a user via a display at the user's phone or via an external caller ID capturing device. Each caller ID is typically stored such that a user may scroll through caller IDs of received calls, even when a recorded message is not left by the caller.

The use of a caller ID capturing device has allowed many people to discontinue use of messaging services and call back those caller IDs that are of interest. However, in returning a call, the caller may not be available. It would be advantageous for a subscriber of a messaging service who is not able to leave a message for another to leave selective greeting messages for that other person according to the person's caller ID.

U.S. Pat. No. 5,748,709 ('709) provides an answering machine with multiple voice mail boxes that is capable of receiving caller ID data and is programmable to automatically route incoming messages to individual mailboxes dependent upon the caller ID. However, the '709 patent does not provide for differentiating greeting messages for a single mailbox based on caller ID data.

It would be advantageous, however, to provide a messaging system that is enabled to receive caller ID data, automatically route incoming messages to individual mailboxes according to caller ID or caller mailbox selection, and automatically play a particular preprogrammed greeting message to the caller according to a caller ID. In particular, it would be advantageous to designate a one-time play greeting message for a caller or a greeting message that is played for every call from that caller.

SUMMARY OF THE INVENTION

In view of the foregoing, it is therefore an object of the present invention to provide an improved messaging system.

It is another object of the present invention to provide an improved method and system for specifying messaging system greetings according to caller identification.

It is yet another object of the present invention to provide a method and system for allowing a messaging system subscriber to pre-record multiple greeting announcements for a single mailbox and specify recipients of each of the multiple greeting announcements according to caller identification.

In accordance with the present invention, a unique caller is identified from an incoming call transmission at a messaging system. A particular greeting announcement is played to the unique caller from among multiple greeting announcements recorded at the messaging system, wherein the particular greeting announcement was previously specified by a subscriber of the messaging system for the unique caller. In a preferred embodiment, the subscriber of the messaging system is enabled to specify multiple greeting announcements according to multiple unique callers for playing prior to switching each unique caller to a single subscriber mailbox at the messaging system.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed to a method, system and program product implemented within a messaging system which allows a subscriber to pre-record and assign particular greeting messages according to caller ID. When a call transmission is received at the messaging system, the caller ID is compared with subscriber-assigned caller IDs and a particular assigned greeting message played according to the caller ID.

Figure 1:
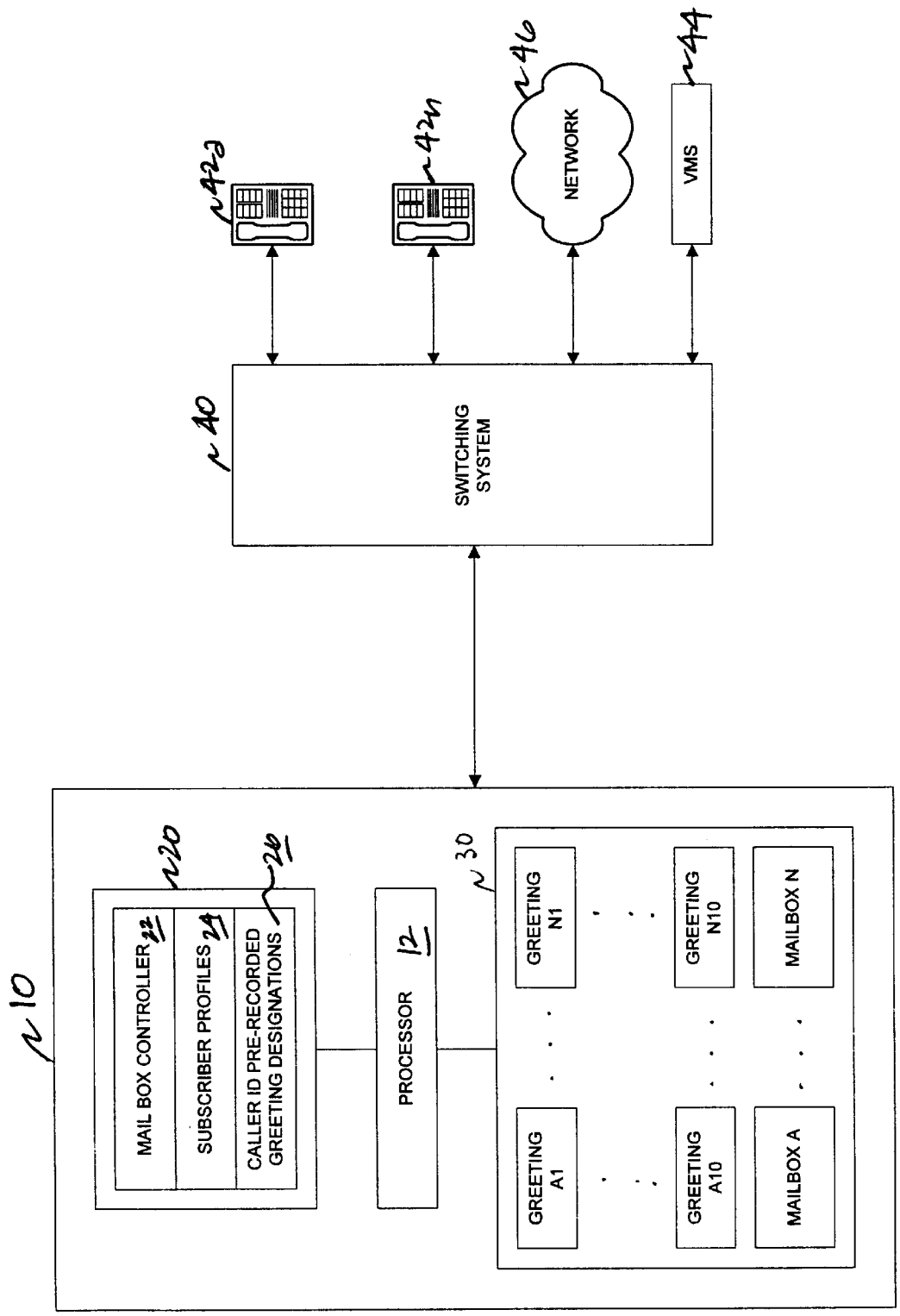
FIG. 1 depicts an embodiment of a block diagram of a voice messaging system in accordance with the method, system and program of the present invention.

The invention is implemented in a messaging system as illustrated in FIG. 1. The invention may, however, be implemented in other types of messaging systems, so while the present invention may be described with references to these figures, these references should not be construed in a limiting sense.

For the purposes of this invention, the term "messaging system" is utilized to refer to both the hardware component that answers calls, plays greeting messages according to caller ID, and records messages, and the software applications stored in memory and being run on the hardware component. In addition, the term messaging system is utilized to refer to both a stand-alone message machine and a network messaging service, such as CallNote™(CallNotes is a trademark of SBC Communications, Inc.).

In addition, for the purposes of this invention, the term "subscriber" refers to the owner or authorized user of a messaging system. In particular, a subscriber is the intended recipient of messages left at a messaging system and in the present invention is enabled to pre-record greeting messages and assign caller IDs to particular greeting messages. The term "caller" refers to a person who is typically not a subscriber of a messaging system and who is calling a phone number associated with a subscriber to access the subscriber directly or to leave a message for the subscriber at a messaging system. A caller could, however, also be the subscriber as when calling in from a remote location to check for messages.

Moreover, for the purpose of this invention, the term "caller ID" preferably refers to multiple forms of caller identification that may be received via a telephone line. In a preferred embodiment, caller ID is in the form of a name assigned to a telephone number and the ten or more digit telephone number that is captured at a communications switching system. However, caller ID may also be in the form of a number keyed in by a caller or an alternate type of unique identifier for that caller. Moreover, a voice recognition system may be implemented to detect a caller ID as spoken by a caller. In particular, a caller may speak a number, name, or other identifier that is detected and utilized as the caller ID. In addition, the caller's actual voice may be recognizable and vocally matched to a voice byte assigned with a caller ID.

With reference now to the figures and in particular with reference to FIG. 1, there is depicted one embodiment of a block diagram of a messaging system in accordance with the method, system and program of the present invention. As depicted, a voice messaging system s (VMS) 10 is connected to a switching system 40 that enables communication between subscriber and caller telecommunication terminals 42a–42n. Subscriber and caller telecommunication terminals 42a–42n may include multiple types of telecommunication terminals including, but not limited to, standard telephone systems, modems, cellular telephones, pagers, etc. In addition, switching system 40 may be part of a telecommunications network 46 that may include other telecommunication terminals, other switching systems, and other messaging systems, such as VMS 44.

VMS 10 is a processor-controlled unit operating under stored-program control. Each VMS 10 includes a processor 12 which executes programs from memory 20. Memory 20 is preferably a combination of suitable machine-readable media, such as random access memory (RAM) and read-only memory (ROM), however may also include other disk and/or tape drive(e.g. magnetic diskette, magnetic tape, CD-ROM, optical disk, or other suitable storage media).

In addition, processor 12 controls a disk memory 30 that implements mailboxes A–N of subscribers served by VMS 10. Disk memory 30 also stores multiple greeting announcements for each of mailboxes A–N that can selectively be retrieved and played out to subscribers and callers according to caller ID. In particular, in the present invention, a subscriber may specify which greeting announcement from, for example, greeting announcements A1–A10 should begin to play to the caller prior to access to mailbox A. Preferably, each subscriber utilizes a single mailbox from among mailboxes A–N, however, a single subscriber may also utilize multiple mailboxes from among mailboxes A–N.

TABLE 1

Index of Greeting Announcements

| Greeting Announcement Number | Greeting Announcement Type |
| --- | --- |
| 1 | Funny Friends and Family |
| 2 | Short Friends and Family |
| 3 | Business Short |
| 4 | Business Schedule |
| 5 | Standard |
| 6 | No Greeting |
| 7 | For John Smith |
| 8 | Spanish |
| 9 | Central Texas |
| 10 | 512-263 Region |

In an example, Table 1 depicts an index of greeting announcements, for example, in greeting announcements A1–A10. Announcement numbers "1" and "2" refer to greeting announcements typically to be played for friends and family. Announcement numbers "3" and "4" refer to greeting announcements typically to be played for business associates and clients. Announcement number "5" refers to a standard greeting announcement that is a default for unknown caller IDs. Announcement number "6" refers to not playing a greeting announcement such that a caller may be directly routed to a mailbox without hearing a greeting. Announcement number "7" refers to a message that is specifically recorded for an individual with a caller ID of John Smith. Announcement number "8" refers to a message that is recorded in Spanish, while announcement number "9" refers to a message that is recorded to be played to callers from the Central Texas area. Announcement number "10" refers to a message that is recorded to be played to callers from the "263" region of the "512" area code.

A subscriber is preferably enabled to record the multiple greeting announcements as depicted in Table 1 and assign each of the multiple greeting announcements to caller IDs. In particular, each of the multiple greetings may be assigned to portions of the caller ID, such as a country code, area code, regional code, etc. As will be understood, the examples of types of greeting announcements that are illustrated in Table 1 may be recorded by a subscriber, however, these references should not be construed in a limiting sense and the subscriber may designate alternate types of greeting announcements.

In particular, in recording the multiple greeting announcements, a subscriber may be prompted after placing a call to record and/or assign-a specific greeting message for the caller ID of the call just made. Advantageously, if a subscriber has called a number and not received a messaging service, then the subscriber may leave a greeting message for the particular caller ID to be played when the caller ID is next detected.

Memory 20 preferably includes a mailbox controller application 22 that directs processor 12 in controlling VMS 10. In particular, in the present invention, mailbox controller application 22 directs functions including, but not limited to, detecting a caller ID, answering and routing a call to the appropriate mailbox 34a–34n, playing a caller ID associated greeting announcement, recording messages, and other functions that will be described herein.

In particular, after capturing a caller ID, mailbox controller 22 preferably directs processor 12 to determine whether caller ID pre-recorded greeting designations 26 includes an assignment associated with that caller ID for a particular greeting message and directs VMS 10 to control play of that particular greeting message or a default if no assignment has been made for the caller ID.

In particular, subscriber profiles 24 preferably designates the numbers of greetings associated with each subscriber number and the default greeting number associated with each subscriber number. Caller ID pre-recorded greeting designations 26 preferably designates which caller IDs have been assigned to particular greeting messages according to subscriber.

TABLE 2

Subscriber Profiles

| Subscriber Number | Greeting Numbers | Greeting Default | Default Condition |
|---|---|---|---|
| 345-234-0000 | 1–10 | 1 | 8 AM–5 PM |
|  |  | 3 | 5 PM–8 AM |
| 345-234-1111 | 1–6 | 4 | none |

TABLE 3

Caller ID Pre-recorded Greeting Designations

| Subscriber Number | Caller ID | Greeting Announcement Assignment |
|---|---|---|
| 345-234-0000 | 232-444-0000 | 2 |
|  | 141-555-0000 | 2 (7/30/02),4 |
|  | John Smith | 7 (1),4 |
|  | country (Mexico) | 8 |
|  | area code (512) | 9 |
|  | region code (512-263) | 10 |
| 345-234-1111 | 141-555-0000 | 1 |

Table 2 depicts examples of entries that may be included in subscriber profiles 24. Table 3 illustrates examples of entries that may be included in caller ID pre-recorded greeting designations 26.

In the examples, a subscriber number "345-234-0000" has designated caller ID greeting announcement assignments for caller IDs "232-444-0000", "141-555-0000" and "John Smith". In particular, in the examples, both subscribers include assignments for caller ID "141-555-0000". Therefore, when a call is received, according to one method of the present invention, the-subscriber is first looked-up and then the caller ID assignment is determined.

Preferably, in recording and/or assigning a specific greeting message to a caller ID, a subscriber may designate that the greeting message is intended only for the next call from that caller ID or from all calls from that caller ID until changed by the subscriber. For example, Table 3 illustrates a caller ID assignment for "John Smith" where greeting number "7" is designated for the next call from "John Smith" and greeting number "4" is designated for subsequent calls.

In addition to storing caller ID greeting assignments according to a phone number, caller ID greeting assignments may also be stored according to a name or other identity. For example, Table 3 depicts a caller ID assignment for "John Smith". In particular "John Smith" may have multiple phone numbers such as a home phone number, a cellular phone number, a modem phone number, etc, and desire to have the same preferences designated for each phone number assigned to that identity. A subscriber may also designate which phone numbers are to be included with the caller ID identity "John Smith".

Moreover, in addition to storing caller ID greeting assignments according to a complete phone number, caller ID greeting assignments may also be stored according to a portion of a phone number, such as the country code or area code. In the example depicted in Table 3, if the country code for Mexico is captured, then message "8" will be played. Also illustrated in the example, if the area code of "512" is captured, then message "9" will be played. Moreover, in the example, if the regional code of "263" is detected is association with the "512" area code, then message "10" will be played.

In designating a default greeting announcement, as depicted in the example of Table 2, a subscriber may designate time or other condition-dependent defaults. For example, a subscriber may designate a first default greeting announcement between the hours of 8 AM and 5 PM and a second default greeting announcement between the hours of 5 PM and 8 AM. In another example, a subscriber may designate conditional defaults that are dependent upon a detected location of a subscriber, a subscriber's schedule, or other conditional criteria.

In addition, a subscriber may designate a condition-dependent greeting announcement assignment to a caller ID. As depicted in the example of Table 3, a subscriber may designate a date or other condition upon a greeting assignment. In the example, the caller ID of "141-555-0000" is assigned to play greeting number "2" if the caller ID is detected on "Jul. 30, 2002", and otherwise greeting number "4" is to be played for the caller ID.

As with conditional defaults, other types of conditions may also be placed upon a greeting assignment by a subscriber.

Figure 2:
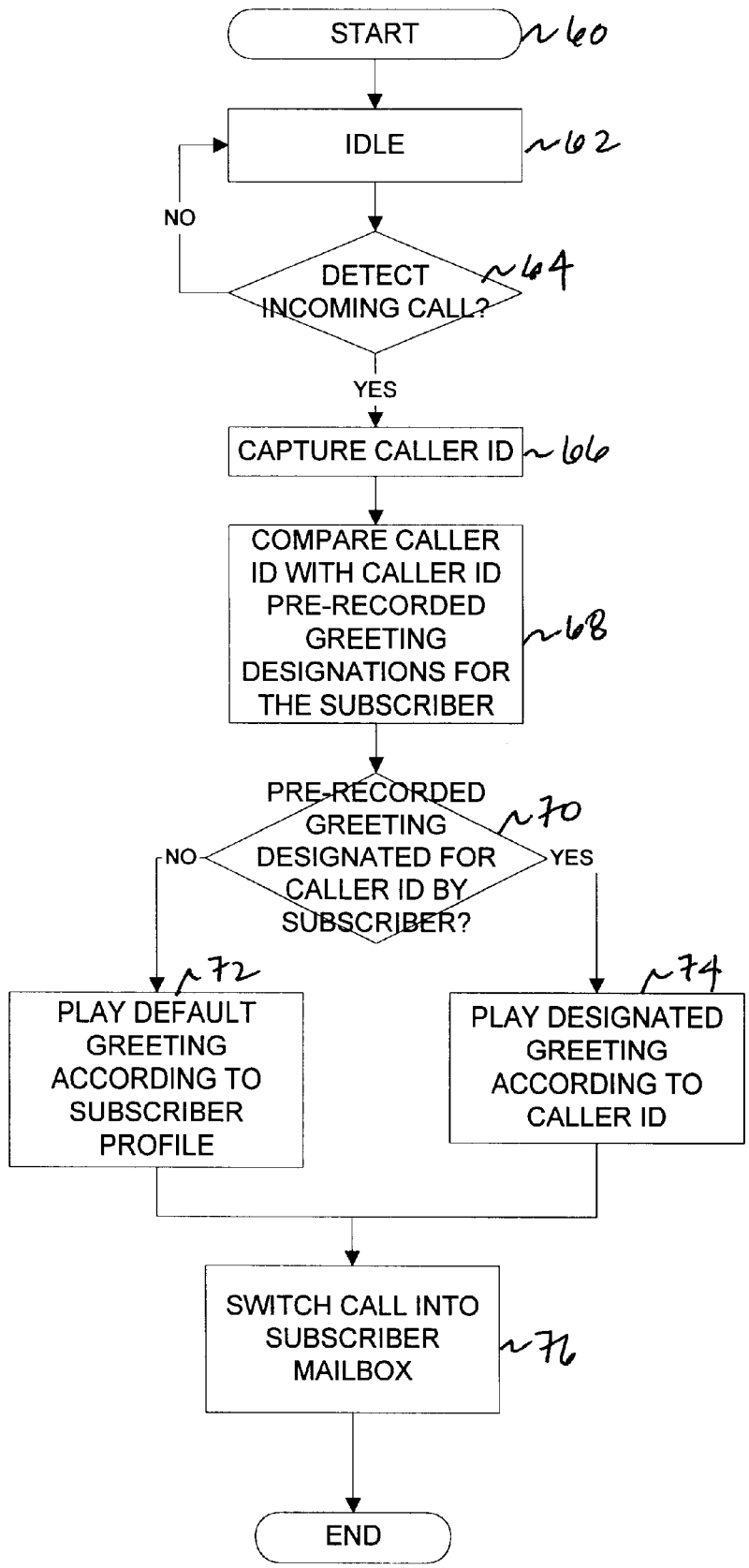
FIG. 2 illustrates a high level logic flowchart of a process and program for controlling a greeting message played to a caller from a messaging system according to caller identification in accordance with the present invention.

Referring now to FIG. 2, there is depicted a high level logic flowchart of a process and program for controlling a greeting message played to a caller from a messaging system according to caller identification in accordance with the present invention. As illustrated, the process starts at block 60 and thereafter proceeds to block 62. Block 62 depicts the messaging system remaining idle. Next, block 64 illustrates a determination as to whether or not an incoming call is detected. If an incoming call is not detected, then the process iterates at block 62 and remains idle. If an incoming call is detected, then the process passes to block 66.

Block 66 depicts capturing caller ID data for the incoming call transmission. Next, block 68 illustrates comparing the captured caller ID with the caller ID pre-recorded greeting designations for the subscriber; and the process passes to block 70.

Block 70 depicts a determination as to whether or not a pre-recorded greeting is designated for the caller ID by the subscriber. If a pre-recorded greeting is not designated for the caller ID or a portion thereof, then the process passes to block 72. Block 72 illustrates playing a default greeting message according to the subscriber profile; and the process passes to block 76. If a pre-recorded greeting is designated for the caller ID, then the process passes to block 74. Block 74 depicts playing the designated greeting according to the caller ID; and the process passes to block 76. Block 76 illustrates switching the call transmission into the subscriber mailbox and recording any message left by the caller; and the process ends.

Figure 3:
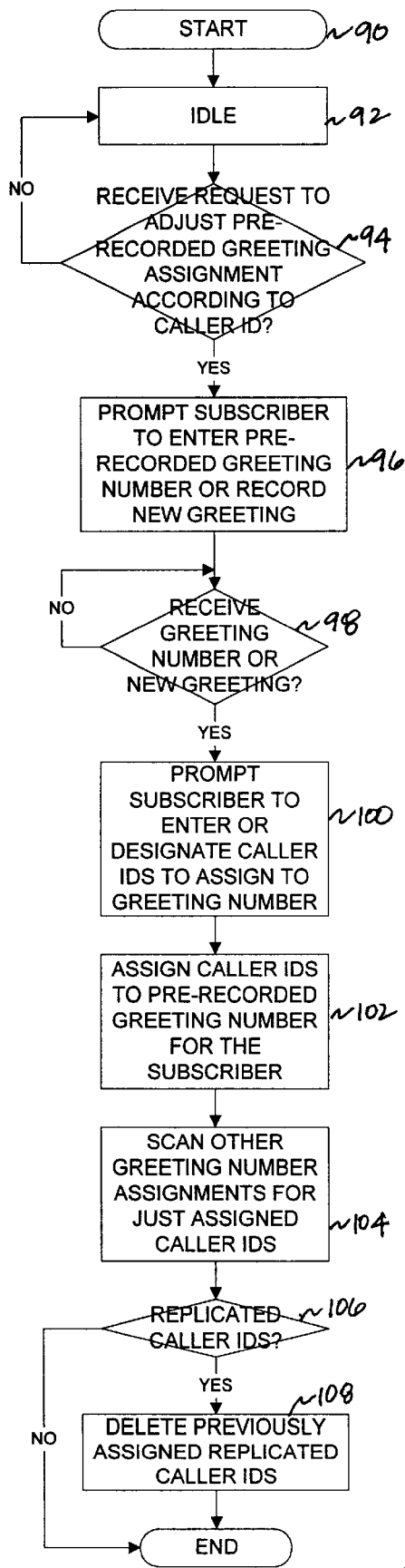
FIG. 3 depicts a high level logic flowchart of a process and program for adjusting subscriber control of greeting message caller identification assignments for a messaging system in accordance with the present invention.

With reference now to FIG. 3, there is depicted a high level logic flowchart of a process and program for adjusting subscriber control of greeting message caller identification assignments for a messaging system in accordance with the present invention. As illustrated, the process starts at block 90 and thereafter proceeds to block 92. Block 92 depicts a messaging system remaining in an idle state. Next, block 94 illustrates a determination as to whether or not a request to adjust pre-recorded greeting assignments according to caller ID is received from a subscriber. If a request to adjust is not received, then the process passes to block 92 and remains idle. If a request to adjust is received, then the process passes to block 96.

Block 96 depicts prompting a subscriber to enter a pre-recorded greeting number or record a new greeting message. Next, block 98 illustrates a determination as to whether or not a greeting number or new greeting is received. If a greeting number or new greeting is not received, then the process iterates at block 98. If a greeting number or new greeting is received, then the process passes to block 100.

Block 100 illustrates prompting the subscriber to enter or designate caller IDs to assign to the greeting number. In particular, a voice messaging system or telephone preferably captures and temporarily stores caller IDs from incoming phone calls, such that a subscriber may later assign greeting numbers to the caller IDs. Next, block 102 depicts assigning the subscriber-entered caller IDs to the pre-recorded greeting number. Thereafter, block 104 illustrates scanning other greeting number assignments for the just assigned caller IDs; and the process passes to block 106.

Block 106 depicts a determination as to whether or not the just assigned caller IDs are replicated in assignments to other greeting numbers. If the just assigned caller IDs are not replicated, then the process ends. If the just assigned caller IDs are replicated, then the process passes to block 108. Block 108 illustrates deleting the previously assigned replicated caller IDs from assignment; and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for specifying greetings on a messaging system according to caller identification, said method comprising the steps of:

in response to a messaging system subscriber calling a unique remote party, prompting said messaging system subscriber from said messaging system with an option to specify a greeting announcement from among a plurality of greeting announcements for playing to said unique remote party;

receiving input in said messaging system specifying a first greeting announcement for playing to said unique remote party, said input being received from said messaging system subscriber;

identifying said unique remote party from an incoming call transmission at said messaging system; and playing said first greeting announcement to said unique remote party from among said plurality of greeting announcements recorded at said messaging system.

2. The method for specifying greetings according to claim 1, said method further comprising the step of:

directing said incoming call transmission to a common mailbox for storage of a message from said unique remote party subsequent to playing said first greeting announcement.

3. The method for specifying greetings according to claim 1, said step of identifying a unique remote party from an incoming call transmission further comprising the step of:

capturing a caller identification associated with said incoming call transmission to identify said unique remote party.

4. The method for specifying greetings according to claim 1, said method further comprising the step of:

recording a greeting announcement from said subscriber to add to said plurality of greeting announcements available for specifying at said messaging system.

5. The method for specifying greetings according to claim 1, said method further comprising the step of:

playing said first greeting announcement to said unique remote party for only a pre-specified number of call transmissions detected from said unique remote party at said messaging system.

6. The method for specifying greetings according to claim 1, said method further comprising the step of:

playing a default greeting announcement according to a subscriber designated default greeting announcement from among said plurality of greeting announcements, in response to identifying a remote party without a greeting announcement assignment previously made by said subscriber.

7. A messaging system, said system comprising:

a communication medium enabled for reception of an incoming call transmission;

a plurality of greeting announcements stored in a data storage medium in association with a subscriber;

means for, responsive to a subscriber of said messaging system calling a unique remote party, prompting said subscriber with an option to specify a greeting announcement from among said plurality of greeting announcements for playing to said unique remote party and receiving input from said subscriber specifying a first greeting announcement for playing to said unique remote party;

means for identifying said-unique remote party from an incoming call transmission via said communication medium; and means for playing said first greeting announcement to said unique remote party from among said plurality of greeting announcements.

8. The messaging system according to claim 7, said system further comprising:

means for directing said incoming call transmission to a single common mailbox for storage of a message from said unique remote party subsequent to playing said particular greeting announcement.

9. The messaging system according to claim 7, said means for identifying a unique remote party from an incoming call transmission further comprising:

means for capturing a caller identification associated with said incoming call transmission to identify said unique remote party.

10. The messaging system according to claim 7, said system further comprising:

means for recording a greeting announcement from said subscriber to add to said plurality of greeting announcements available for specifying at said messaging system.

11. The messaging system according to claim 7, said system further comprising:

means for playing said first greeting announcement to said unique remote party for only a pre-specified number of call transmissions detected from said unique remote party at said messaging system.

12. The messaging system according to claim 7, said system further comprising:

means for playing a default greeting announcement according to a subscriber designated default greeting announcement from among said plurality of greeting announcements, in response to identifying a remote party without a greeting announcement assignment previously made by said subscriber.

13. A computer program product to provide specification of greetings according to caller identification, said program product comprising:

a storage medium;

program instructions on said storage medium for:

in response to a subscriber of a messaging system calling a unique third party, prompting said subscriber with an option to specify a greeting announcement from among a plurality of greeting announcements for playing to said unique remote party;

receiving input specifying a first greeting announcement for playing to said unique remote party, said input being received from said subscriber;

identifying said unique remote party from an incoming call transmission at said messaging system; and playing said first greeting announcement to said unique remote party from among said plurality of greeting announcements recorded at said messaging system.

14. The computer program product according to claim 13, further comprising program instructions for:

directing said incoming call transmission to a common mailbox for storage of a message from said unique remote party subsequent to playing said first greeting announcement.

15. The computer program product according to claim 13, wherein said program instructions for said step of identifying a unique remote party further include program instructions for:

capturing a caller identification associated with said incoming call transmission to identify said unique remote party.

16. The computer program product according to claim 13, further comprising program instructions for:

recording a greeting announcement from said subscriber to add to said plurality of greeting announcements available for specifying at said messaging system.

17. The computer program product according to claim 13, further comprising program instructions for:

playing said first greeting announcement to said unique remote party for only a pre-specified number of call transmissions detected from said unique remote party at said messaging system.

18. The computer program product according to claim 13, further comprising program instructions for:

playing a default greeting announcement according to a subscriber designated default greeting announcement from among said plurality of greeting announcements, in response to identifying a remote party without a greeting announcement assignment previously made by said subscriber.

19. A method for operating a messaging system comprising the steps of:

generating a Plurality of greeting announcements for playing to remote parties calling a subscriber of said messaging system' receiving input from said subscriber for selecting a pre-specified number of times that a first greeting announcement being played to a first remote party;

identifying said first remote party from an incoming call transmission at said messaging system; and responsive to said identifying step, playing said first greeting announcement to said first remote party from among said plurality of greeting announcements recorded at said messaging system only if said first greeting has not yet been played said pre-specified number of times;

if said first greeting has already been played said pre-specified number of times, playing a second greeting announcement to said first remote party from among said plurality of greeting announcements recorded at said messaging system.

20. The method for operating a messaging system of claim 19, further comprising the steps of:

receiving input from said subscriber specifying a second greeting announcement of said plurality of greeting announcement for playing to said first remote party after said first greeting announcement has been played said pre-specified number of times; and responsive to said identifying step, playing said second greeting announcement to said first remote party from among said plurality of greeting announcements recorded at said messaging system if said first greeting has already been played said pre-specified number of times.

21. The method for operating a messaging system of claim 19, wherein said pre-specified number is one.

22. The method for operating a messaging system of claim 19, wherein said step of identifying said first remote party from an incoming call transmission comprises the step of:

capturing a caller identification associated with said incoming call transmission to identify said first remote party.

23. The method for operating a messaging system of claim 19, said method further comprising the step of:

recording a greeting announcement from said subscriber to add to said plurality of greeting announcements available for specifying at said messaging system.

24. The method for operating a messaging system of claim 19, said method further comprising the step of:

playing a default greeting announcement to said first remote party according to a subscriber designated default greeting announcement from among said plurality of greeting announcements, if said first greeting has been played said pre-specified number of times.

* * * * *